United States Patent
Everhart et al.

(10) Patent No.: US 7,930,163 B2
(45) Date of Patent: Apr. 19, 2011

(54) MODELING A STORAGE ENVIRONMENT AT VARIOUS TIMES

(75) Inventors: Craig Fulmer Everhart, Chapel Hill, NC (US); Thirumale Niranjan, Karnataka (IN); Siddhartha Nandi, Karnataka (IN); Kaladhar Voruganti, San Jose, CA (US); Sai Rama Krishna Susarla, Karnataka (IN)

(73) Assignee: NetApp, Inc., Sunnyvale, CA (US)

( * ) Notice: Subject to any disclaimer, the term of this patent is extended or adjusted under 35 U.S.C. 154(b) by 494 days.

(21) Appl. No.: 12/112,009

(22) Filed: Apr. 30, 2008

(65) Prior Publication Data

US 2009/0276203 A1 Nov. 5, 2009

(51) Int. Cl.
- G06F 9/44 (2006.01)
- G06F 13/10 (2006.01)
- G06F 13/12 (2006.01)

(52) U.S. Cl. .......................... 703/21; 702/186
(58) Field of Classification Search ............ 703/21
See application file for complete search history.

(56) References Cited

U.S. PATENT DOCUMENTS

| | | | |
|---|---|---|---|
| 6,542,854 B2 * | 4/2003 | Yang et al. | 702/186 |
| 6,622,221 B1 * | 9/2003 | Zahavi | 711/154 |
| 6,957,433 B2 * | 10/2005 | Umberger et al. | 718/103 |
| 7,103,874 B2 | 9/2006 | Mccollum et al. | |
| 7,184,933 B2 * | 2/2007 | Prekeges et al. | 702/186 |
| 7,493,300 B2 * | 2/2009 | Palmer et al. | 706/56 |
| 7,519,624 B2 * | 4/2009 | Korupolu et al. | 1/1 |
| 2004/0205089 A1 | 10/2004 | Alon et al. | |
| 2005/0256961 A1 | 11/2005 | Alon et al. | |
| 2005/0262233 A1 | 11/2005 | Alon et al. | |
| 2006/0037019 A1 | 2/2006 | Austin et al. | |
| 2007/0088763 A1 | 4/2007 | Yahalom et al. | |
| 2007/0245004 A1 | 10/2007 | Chess et al. | |
| 2009/0276202 A1 | 11/2009 | Susarla et al. | |

FOREIGN PATENT DOCUMENTS

| | | |
|---|---|---|
| DE | 3935711 | 5/1990 |
| WO | WO-2006037711 | 4/2006 |
| WO | WO-2009134255 A2 | 11/2009 |
| WO | WO-2009134262 A1 | 11/2009 |

OTHER PUBLICATIONS

Singh et al, "Zodiac: Efficient Impact Analysis for Storage Area Networks", Proceedings of the 4th USENIX Conference on File and Storage Technologies, vol. 4, Dec. 13-16, 2005.*

(Continued)

*Primary Examiner* — Jason Proctor
*Assistant Examiner* — Mary C Jacob
(74) *Attorney, Agent, or Firm* — Schwegman, Lundberg & Woessner P.A.

(57) ABSTRACT

Example embodiments provide various techniques for modeling a storage environment at various times. A computer model can be composed to simulate a storage environment at various time periods. In an example, the computer model may simulate the storage environment in the past. As the storage environment is running, it continuously stores its existing state. This existing state can be accessed and a simulated workload may be applied to this previous state to identify an impact of the simulated workload on the existing state. A computer model may also simulate the storage environment in the future. Here, the future state of the storage environment may be projected from the existing state. Various extrapolation techniques may be used to project the future state of the storage environment.

18 Claims, 11 Drawing Sheets

OTHER PUBLICATIONS

Anderson et al, "Ergastulum: Quickly Finding Near-Optimal Storage System Designs", HP Tech Report HPL-SSP-2001-5, 2001.*

Brienbrink et al, "SimLab: A Simulation Environment for Storage Area Networks", In Workshop on Parallel and Distributed Processing, 2001.*

Ganger et al, "The DiskSim Simulation Environment Version 2.0 Reference Manual", Dec. 1999.*

Jin et al, Performance Evaluation and Prediction for Legacy Information Systems, 29th International Conference on Software Engineering, May 20-26, 2007.*

"International Application Serial No. PCT/US2008/062046, Search Report mailed Feb. 3, 2009".

"International Application Serial No. PCT/US2008/062046, Written Opinion mailed Feb. 3, 2009".

"International Application Serial No. PCT/US2008/062074, Search Report mailed Feb. 9, 2009".

"International Application Serial No. PCT/US2008/062074, Written Opinion mailed Feb. 9, 2009".

Aizikowitz, N., et al., "Component-Based Performance Modeling of a Storage Area Network", Proceeding of the 2005 Winter Simulation conference (Dec. 4, 2005), 10 pgs.

Wang, Chao-Yang., et al., "Simulation and analysis of fc networks", *Local computer networks, 2003. Proceedings. 28th Annual IEEE, International Conference* (Oct. 20, 2003), 4 pgs.

Wang, Chao-Yang., et al., "Simulation of fibre channel storage area network using SANSim", *The 11th IEEE International Conference on Network* (Sep. 28, 2003), 6 pgs.

Ganger, G. R, et al., "Using system-level models to evaluate I/O subsystem designs", *IEEE Transactions on Computers*, vol. 47, No. 6 (Jun. 1998), 12 pgs.

Lu, Y., et al., "Simulation Study of ISCSI Storage System", *Mass Storage Systems and Technologies, 2004. Proceedings.*, 21 IEEE/ 12th NASA Goddard Conference, Piscataway, NJ, USA, IEEE, XP002511846 (Apr. 2004), 10 pgs.

Wang, Min, et al., "A Component-Based Analytical Performance Model of IP-Based San", *Institute of Computing Technology, Chinese Academy of Science*. Beijing 100080, *Graduate school of the Chinese Academy of Science*, Beijing 100039 (May 2, 2007), 12pgs.

Molero, X, et al., "On the effect of link failures in fibre channel storage area networks", *Parallel Architectures, Algorithms and networks. Proceedings.* International Symposium on Dallas (Dec. 7, 2000), 10 pgs.

Molero, X., et al., "Modeling and Simulation of storage area networks", *Modeling, Analysis and Simulation of computer & telecommunication systems, Proceedings.* 8th international symposium on San Francisco, CA, USA (Aug. 29, 2000), 9 Pgs.

Wang, Yijian., et al., "Execution-driven simulation of network storage systems", The IEEE computer Society's 12th annual International symposium on volendam (Oct. 4, 2004), 8 pgs.

"U.S. Appl. No. 12/112,000 Non-Final Office Action mailed Aug. 2, 2010", 18 pgs.

"U.S. Appl. No. 12/112,000, Examiner Interview Summary Received Oct. 26, 2010", 3 pgs.

"U.S. Appl. No. 12/112,000, Final Office Action mailed Jan. 25, 2011", 28 pgs.

"U.S. Appl. No. 12/112,000, Response filed Nov. 2, 2010 to Non Final Office Action mailed Aug. 2, 2010", 15 pgs.

Chao, et al., "Using MMQ Model for Performance Simulation of Storage Area Network", IEEE, (2005), pp. 1-4.

* cited by examiner

MODELING A STORAGE ENVIRONMENT AT VARIOUS TIMES

FIELD

The present disclosure relates generally to computer modeling. In an example embodiment, the disclosure relates to the modeling of storage environments at various times.

BACKGROUND

A storage environment can be a complex environment because of the numerous hardware and software components included in the storage environment and the various interconnections between the components. Examples of components may include network pipes, caches, storage servers, switches, storage controllers, and other components. As a result, the management and design of storage environments may be particularly complex and time-consuming tasks. For example, workloads may be added to server systems associated with a storage environment. However, storage workloads on the storage environment resulting from the addition of the workloads are particularly difficult to predict. Storage system architects therefore do not have any guidance on the design and management of storage environments.

SUMMARY

Generally, a computer model is a computer program that is programmed to mathematically simulate a variety of systems, such as natural systems, biological systems, and computer systems. Example embodiments of the present invention provide various techniques for modeling a storage environment at various times. In general, a storage environment is a system of computing devices and storage devices (e.g., hard disk arrays and tape drives) where data is stored on the storage devices such that the data can be made available to a variety of client computing devices on a network.

A computer model can be composed to simulate a storage environment at various times. In an example, the computer model may simulate the storage environment in the past. It should be appreciated that, as the storage environment is running, the storage environment may periodically store its existing state. A state of the storage environment is a description of the storage environment at a specific time. The existing states recorded at various past times may be stored or embodied in a configuration table and/or a performance table. The configuration table and the performance table store attributes and values that describe the storage environment. This existing state can be accessed and a simulated workload may be applied to this existing state to identify an impact of the simulated workload on the existing state. A simulated workload is the amount of work that can be assigned to or applied to components of storage environment. For example, a simulated workload may define a number of files to be processed by the storage environment. In another example, the simulated workload may define a flow of data to a particular component of the storage environment.

It should be appreciated that in addition simulating the storage environment in the past, a computer model may also simulate the storage environment in the future. Here, a future state of the storage environment may be constructed using the existing state of the storage environment. In an example, the future state of the storage environment may be projected from the existing state. Various extrapolation techniques may be used to project the future state of the storage environment. Examples of extrapolation techniques may include linear extrapolation, polynomial extrapolation, and other extrapolation techniques. A simulated workload may also be applied to this future state to identify an impact of the simulated workload on the future state. A user may use such future and past impact analysis of a storage environment to design and manage the storage environment.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

A computer model is a computer program that can be programmed to simulate a variety of systems, such as computer systems. In an example, a computer model can be used to mathematically predict the behavior of a system without access to the actual system that is being simulated. In effect, a computer model is actually a mathematical model carried out by a computing device, such as a computer. The mathematical model may be constructed to find analytical solutions to various types of problems, such as prediction of weather and physics simulation.

In an example, a computer model can be used to predict the behavior of a storage environment. A storage environment is a system of computing devices and storage devices where data is stored on the storage devices such that the data can be made available to a variety of client computing devices on a network. It should be appreciated that a computer model of the storage environment may be constructed and this computer model uses a mathematical model of the storage environment to mathematically analyze or simulate the storage environment. Such mathematical analysis enables the simulation of current storage environments as well as past storage environments. Furthermore, the mathematical analysis enables the behavior of the storage environment to be predicted in the future. As explained in more detail below, the prediction can be made by analyzing the past behaviors of the storage environment or a similar storage environment. Such analysis of past, current, and future storage environments may be used to facilitate the design and management of a storage environment by allowing a user, for example, to test changes to storage environments at various time periods.

Figure 1:
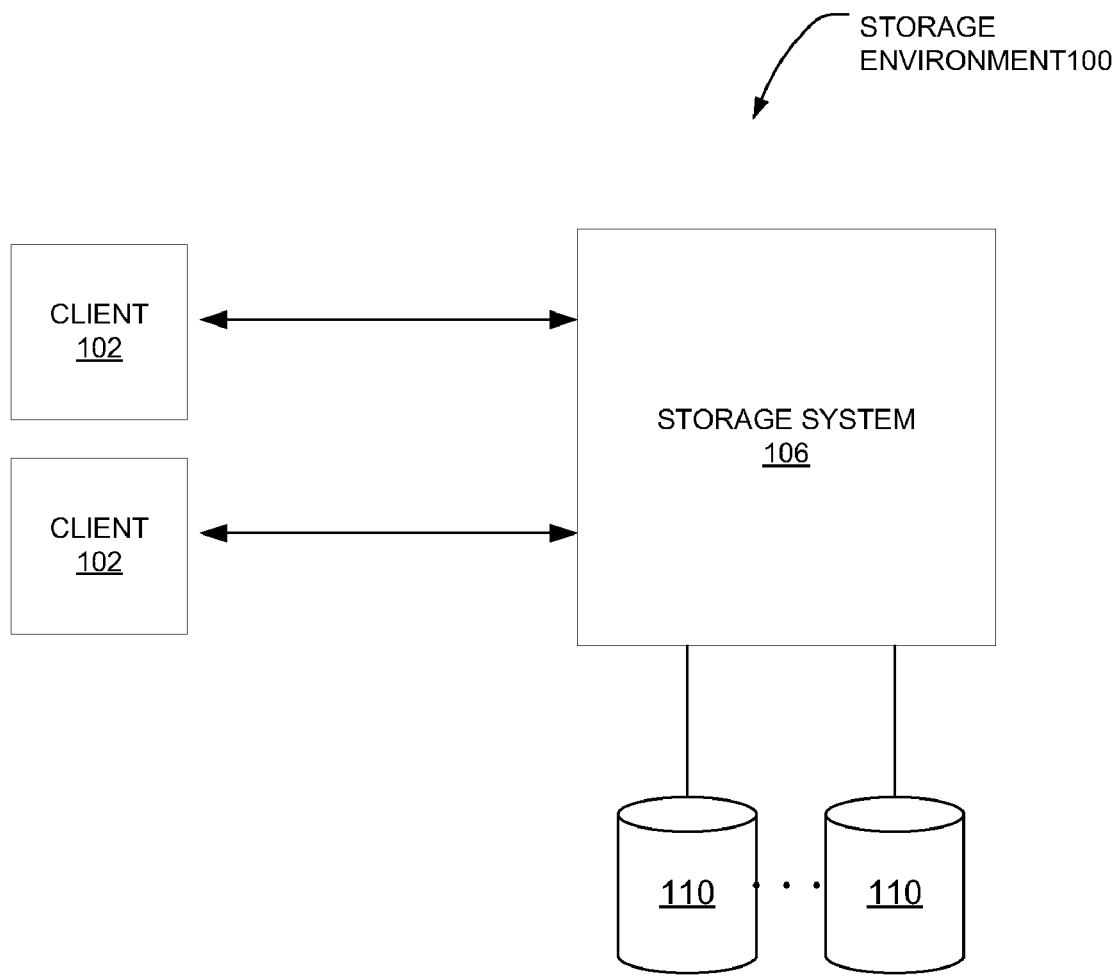
FIG. 1 depicts a simplified block diagram of a storage environment, in accordance with an example embodiment.

FIG. 1 depicts a simplified block diagram of a storage environment 100, in accordance with an example embodiment. The storage environment 100 includes clients 102, storage system 106, and storage devices 110. The storage system 106 is one or more computing devices that provide a storage service related to the organization of information on writable, persistent storage devices 110, such as non-volatile memories, tapes, hard drives, optical media, and other storage devices. The storage system 106 can be deployed within a Storage Area Network (SAN) or a Network Attached Storage (NAS) environment.

When used within a NAS environment, for example, storage system 106 may be embodied as a storage server that is configured to operate according to a client/server model of information delivery to thereby allow multiple client computing devices (e.g., clients 102) to access shared resources, such as files, stored on the storage server. The storage of data on a NAS environment can be deployed over a computer network that includes a geographically distributed collection on interconnected communication links, such as Ethernet, that allow clients 102 to remotely access the data (e.g., files) on the storage server. The clients 102 can communicate with the storage server by exchanging discrete frames or packets of data according to predefined protocols, such as Transmission Control/Internet Protocol (TCP/IP).

A SAN is a high-speed network that enables establishment of direct connections between storage system 106 and its storage devices 110. The SAN may thus be viewed as an extension to a storage bus and, as such, an operating system of storage system 106 enables access to stored data using block-based access protocols over an extended bus. In this context, the extended bus can be embodied as Fibre Channel, Computer System Interface (SCSI), Internet SCSI (iSCSI), and other network technologies.

Figure 2:
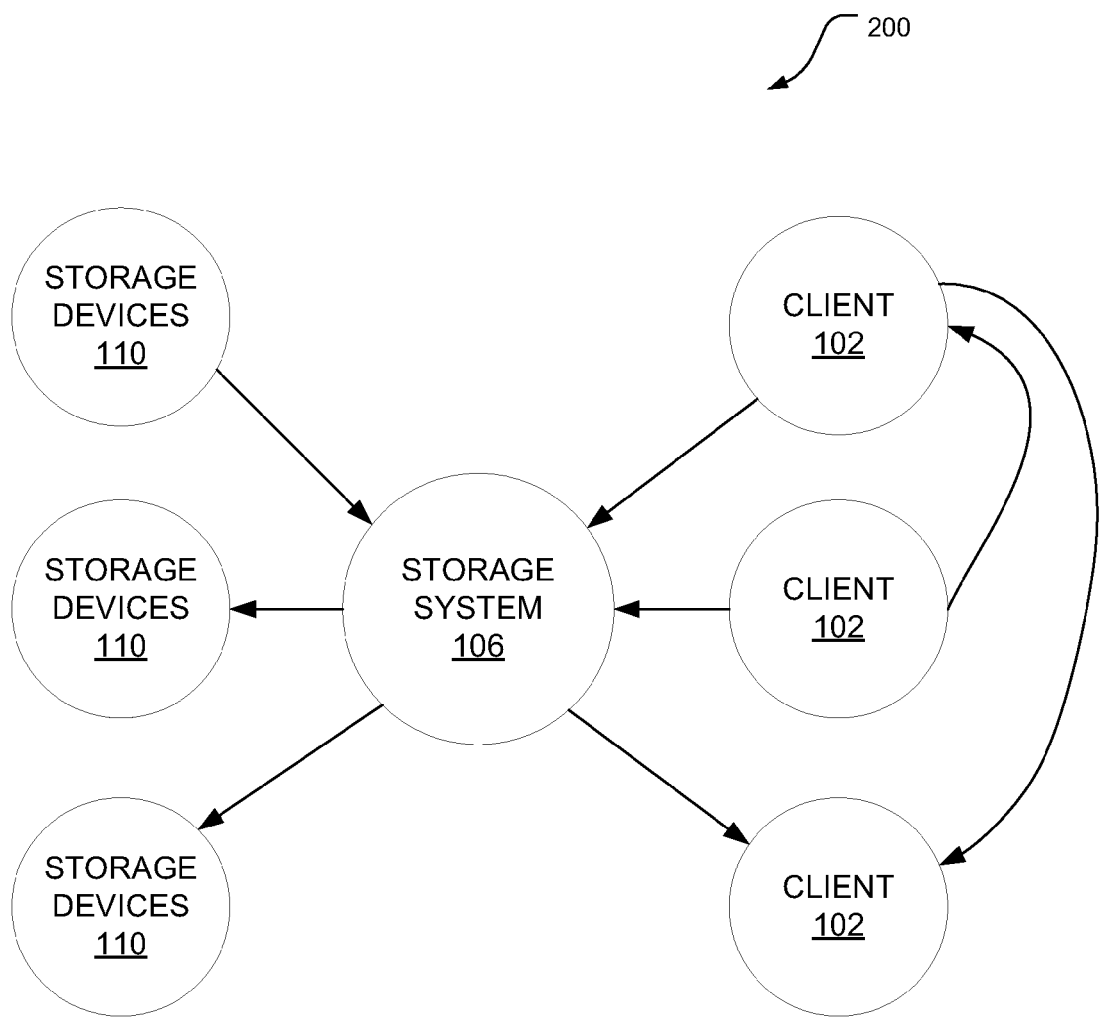
FIG. 2 depicts a representation of a system model of a storage environment, in accordance with an example embodiment.

FIG. 2 depicts a representation of a system model 200 of the storage environment, in accordance with an example embodiment. Generally, a computer model is a computer program that can be programmed to simulate a variety of systems, such as computer systems. A computer model can be used to numerically predict the behavior of a system from a set of parameters (e.g., attributes) and initial conditions without using or access to the actual system that is being simulated. For example, a computer model can be used predict the behavior of a system. As shown in FIG. 2, system model 200 (or storage environment model) is represented by a directed graph. The system model 200 is a computer model that is configured to simulate a storage environment. In effect, system model 200 is a functional representation of the storage environment.

A storage environment is comprised of a variety of components. As explained in more detail below, the components of a storage environment may include software applications, hardware, and services. For example, as depicted in FIG. 2, each component of the storage environment may be represented as a node in the directed graph of system model 200. Here, the directed graph of system model 200 shows or defines the components of an example storage environment, such as storage devices 110, storage system 106, and clients 102. Additionally, the directed graph defines the functional relationships between the components of the storage environment with arrows between the components. It should be appreciated that a directed graph (or digraph) is a graph whose edges are ordered pairs of nodes. That is, each edge can be followed from one node to another node. An arrow or line that connects one node to another node may, for example, illustrate that the nodes are operatively associated with each other. The direction of the arrows may, for example, illustrate the input/output of data between the nodes. In addition to representing system model 200 of the storage environment with the directed graph, other representations may be used to depict the components and functional relationships. Another example of a representation may include a mixed graph having directed and undirected edges. In still yet another example, system model 200 may be represented by a table that lists the components and the functional relationships between the components. Other example representations include flowcharts, weighted graphs, map diagrams, and other representations.

As will be explained in more detail below, the embodiments described herein provide a user with the ability to view and analyze a system model 200 of a storage environment at a variety of different times. The time may include past, current, and future times. For example, system model 200 may be configured to simulate a state of a storage environment at a past time. In another example, system model 200 may be configured to simulate a state of the storage environment at a future time.

Figure 3:
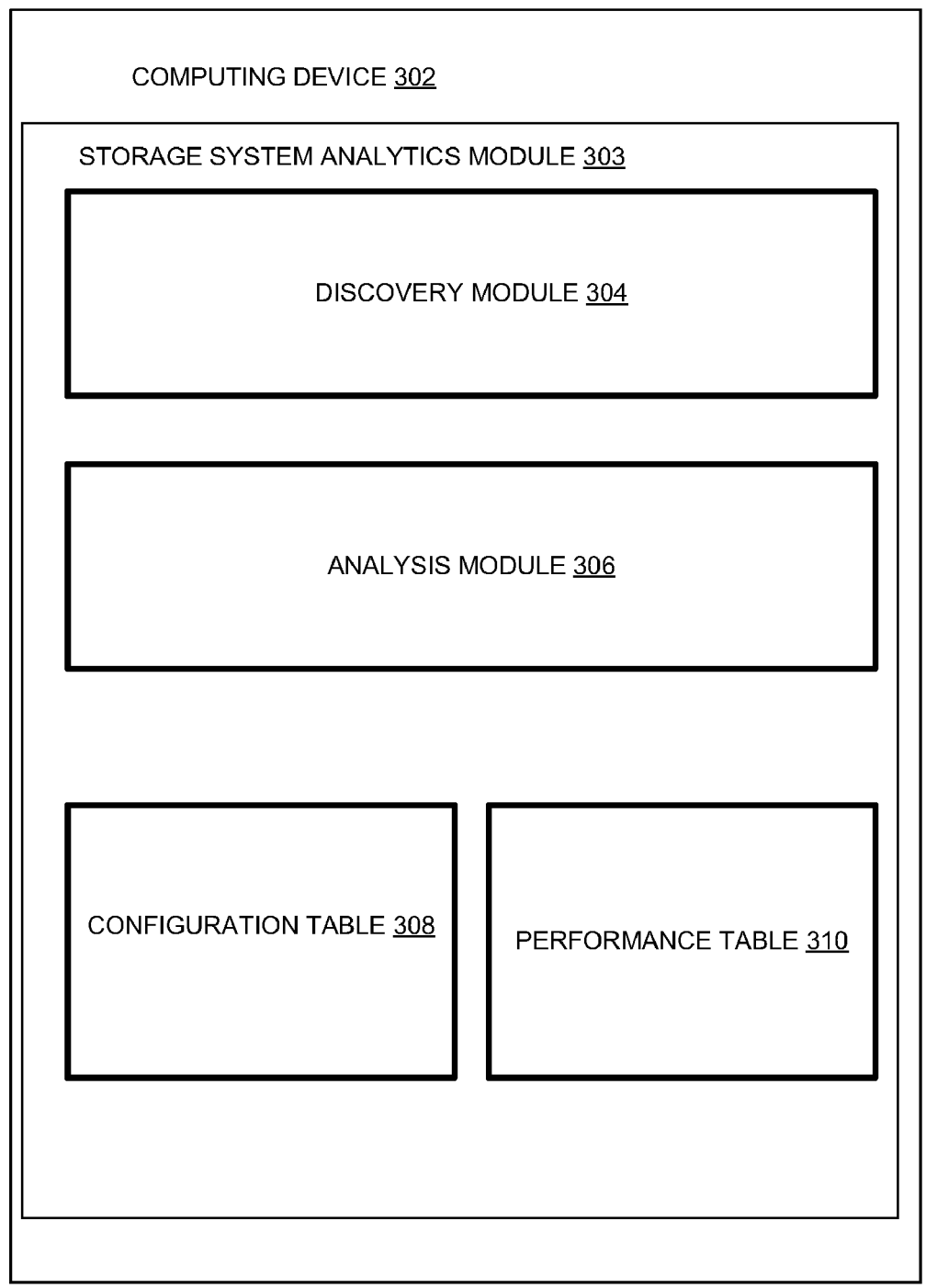
FIG. 3 depicts a block diagram of modules, in accordance with an example embodiment, included in computing device that are configured to provide simulations of storage environments at various times.

FIG. 3 depicts a block diagram of modules 304 and 306, in accordance with an example embodiment, included in computing device 302 that are configured to provide simulations of storage environments at various times. The computing device 302 is configured to host or execute the storage system analytics module 303. Examples of computing device 302 include personal computers, server computers or other computing devices. The computing device 302 may be included in a storage environment (e.g., a client computing device in communication with a storage system) or may be a stand-alone computing device independent of the storage environment. The storage system analytics module 303 is configured to model a storage environment. As depicted in FIG. 3, discovery module 304 and analysis module 306 may be included in storage system analytics module 303. Furthermore, storage system analytics module 303 may store configuration table 308 and performance table 310.

The discovery module 304 is configured to access existing states of the storage environment. A state of the storage environment is a description of the storage environment at a specific time. The state of the storage environment may, for example, be defined by a set of attributes and values associated with the attributes. In effect, the attributes and their values define a state of the storage environment. An attribute is a feature of the storage environment. Examples of attributes may include buffer size, connectivity information, Redundant Arrays of Inexpensive Disks (RAID) level, number of ports, bandwidth, latency, input/output rate, and other attributes. A value associated with the attribute may include a magnitude, a quantity, a number and/or other values that are assigned to one or more attributes. An existing state may include a state from a past time or from a current or most recent time. As will be explained in more detail below, a system model of the storage environment may be composed from the state of the storage environment, which may be embodied in the attributes and their values.

The attributes and their values may be stored in a variety of data structures, such as databases, tables, arrays, linked lists, and other data structures. For example, the attributes and their values may be stored in configuration table 308 and/or performance table 310. The configuration table 308 is a table that is configured to store configuration information of a storage environment. Configuration information describes the totality of the storage environment and any other devices connected to the storage environment. Examples of configuration information include connectivity information, the number of buffers assigned to a host, raid level of a device, number of ports, and other configuration information. On the other hand, performance table 310 is a table that is configured to store performance information of the storage environment. Performance information is information related to the process, the manner of functioning or the operating of the storage environment. Examples of performance information include bandwidth, latency, input/output rate, and other performance information.

With the existing state accessed, analysis module 306 may compose a system model of the storage environment from the existing state, in accordance with an example embodiment. As will be explained in more detail below, a simulated workload may then be applied to this system model to identify an impact of the simulated workload on the existing state. In another example embodiment, as will also be explained in more detail below, analysis module 306 may also project a future state of the storage environment based on the existing state. A user may then apply further simulated workloads to the future state of the storage environment to identify impacts of the simulated workloads on the future state.

It should be appreciated that in other example embodiments, discovery module 304 and analysis module 306 may include fewer or more modules apart from those shown in FIG. 3. For example, discovery module 304 may be integrated with analysis module 306 to form one module. In another example, discovery module 304, configuration table 308, and performance table 310 may be hosted on computing device 302 while analysis module 306 may be hosted on a separate computing device.

Figure 4:
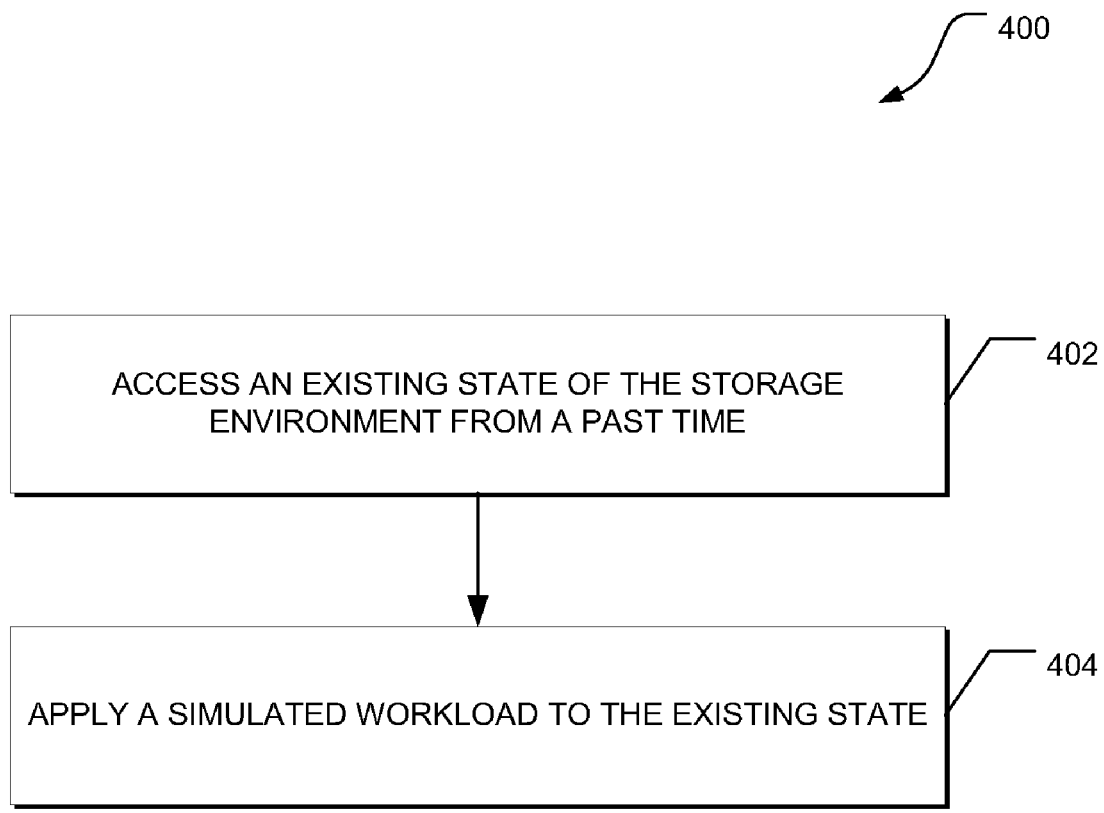
FIG. 4 depicts a flow diagram of a general overview of a method, in accordance with an example embodiment, for modeling a storage environment at a past time.

FIG. 4 depicts a flow diagram of a general overview of a method 400, in accordance with an example embodiment, for modeling a storage environment at a past time. In an example embodiment, method 400 may be implemented by discovery module 304 and analysis module 306 of FIG. 3 and employed in computing device 302. Here, a user may want to view and analyze a state of the storage environment at a specific past time. As depicted in FIG. 4, an existing state of the storage environment from this specific past time is accessed at 402. The existing state of the storage environment may be stored, for example, in a configuration table and/or a performance table. The attributes and values that define this existing state may be outputted from an actual, operating storage environment. As this storage environment is running, the storage environment may periodically record its state in the configuration table and/or performance table. As a result, various states associated with various past times are stored in the configuration and performance tables. In an example, a single set of configuration and performance tables may be assigned to store attributes and associated values from a particular time or a particular time period. Therefore, states from multiple times may be stored in multiple sets of configuration and performance tables. In another example, all the attributes and associated values from various past times may be stored in one set of configuration and performance tables.

A simulated workload may then be applied to the existing state at 404 to identify an impact of the simulated workload on the existing state. A simulated workload is the amount of work that can be assigned to or applied to a component of the storage environment or, as explained in more detail below, to a component model of a system model. For example, a simulated workload may define a number of files to be processed by the storage environment. In another example, the simulated workload may define a flow of data to a particular component of the storage environment. With a simulated workload applied, a directed graph or other representation of the system model can be configured to define the impact of the simulated workload on the storage environment at the specific past time. The impact is the effect of the simulated workload on a system model of a storage environment. As a result, for example, a user can use such impact information to troubleshoot the storage environment at a specific past time. In another example, a user can use the impact information to assess the performance of a given application that is designed to make use of the storage environment at a specific past time.

Figure 5:
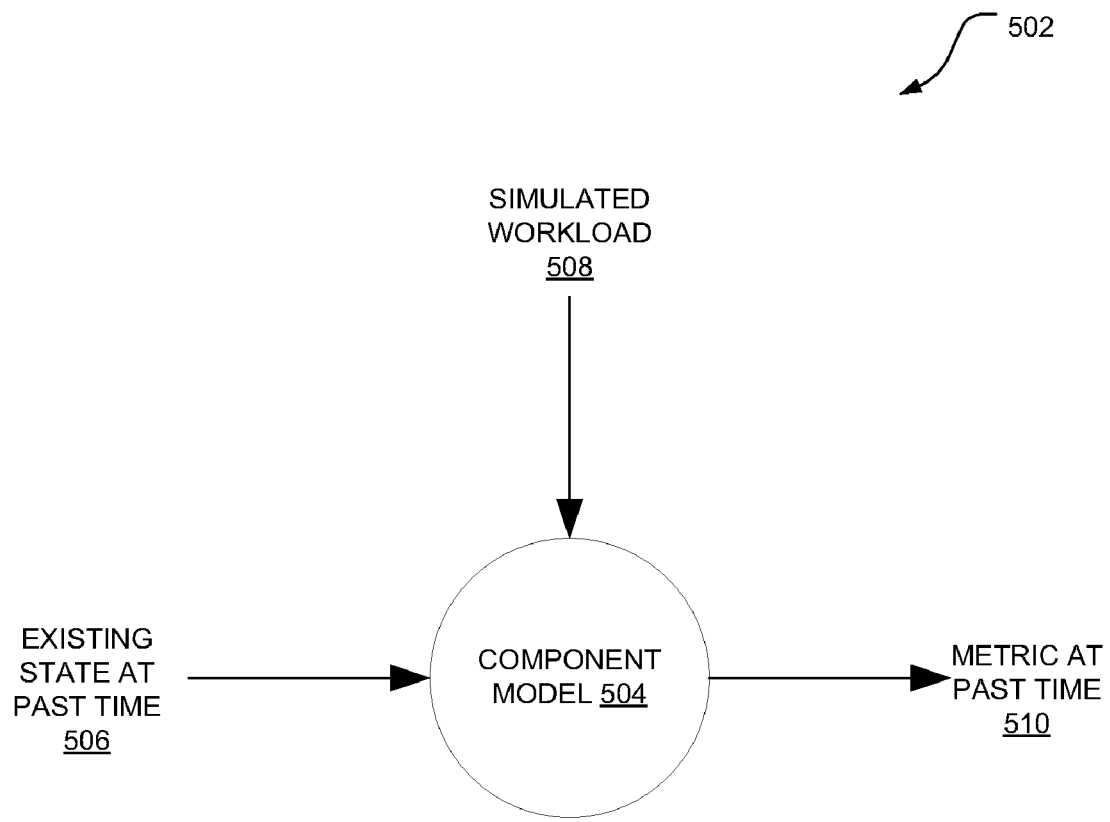
FIG. 5 is a diagram of a more detailed method, in accordance with an example embodiment, for identifying an impact of a simulated workload on a storage environment at a past time.

FIG. 5 is a diagram of a more detailed method, in accordance with an example embodiment, for identifying an impact of a simulated workload 508 on a storage environment at a past time. It should be appreciated that a storage environment is comprised of a variety of components and each component may be simulated by one or more component models, such as component model 504. In an example, a system model 502 may simulate the networking storage system by combining the component models associated with the storage environment. In effect, the system model 502 is a collection of interconnected component models, an example of which is illustrated in FIG. 2.

A single component model 504 is depicted in FIG. 5 from a single node in a directed graph of a system model 502. The component model 504 is configured to simulate a component associated with a storage environment. In effect, a component model 504 is a functional representation of a component associated with a storage environment. Components may include hardware, software, and/or services. The components may be included within a storage environment. Alternately, the components may be configured to work with or communicate with the storage environment. Examples of hardware components associated with a storage environment include storage servers, storage controllers, client computers, hard disk drives, optical disk drives, processors, random access memories, non-volatile memories, tape drives, controllers (e.g., Redundant Array of Independent Disks (RAID) controllers), switches (e.g., Fibre Channel switches), adaptors (e.g., Storage Area Network (SAN) adaptors, Computer System Interface (SCSI) tape adaptors, network adaptors, and other adaptors), power supplies, network pipes, computer buses (Peripheral Component Interconnect (PCI) buses, SCSI buses, and other computer buses), and other hardware components. Examples of software components include operating systems, data replication software, data classification and management software, device drivers, databases, volume managers, file systems, multipathing software, backup and recovery software, antivirus software, networking software, data security or protection software, data search engines, file storage resource management software, data retention software, system management software, performance software, end-user application software, and other software components.

In addition to hardware and software components of a storage environment, component model 504 may also simulate one or more services. Generally, a service is an act performed by a user. Examples of acts by a user include deploying software, accessing software, and a variety of other acts. In effect, component model 504 may be a functional representation of a component associated with a service rendered by a user. Such component model 504 that simulates a service may be defined by time. For example, the component model 504 may define that a user may take fifty five minutes to deploy software. In another example, component model 504 may define that a user may take three minutes to login an operating system.

To identify an impact of simulated workload 508 at a past time, an existing state 506 of the storage environment recorded at that specific time in the past is accessed. A system model 502 can then be composed based on this existing state. For example, information regarding the type of component models associated with the storage environment and interconnectivity information can be extracted from the existing state and used to build system model 502. It should be appreciated that system model 502 may be composed from the component models. In effect, the system model 502 is constructed from the component models. In an example, system model 502 may be constructed by connecting the component models with each other based on functional relationships between the component models. A functional relationship is the association of a component model with other component models within system model 502.

The simulated workload 508 may then be applied to the system model 502, which simulates the storage environment at the specific past time, to identify an impact of the simulated workload. In a simplified example, FIG. 5 depicts a single component model 504 from a collection of component models that comprise the system model 502. The existing state 506 is provided to the system model 502. For example, existing state 506 at the specific past time is provided as an input into component model 504. The simulated workload 508 is also applied to component model 504. As a result, component model 504 outputs metric 510 at the specific past time, which defines an impact of the application of simulated workload 508 on existing state 506 of storage environment. The metric 510 may include a variety of measurements that facilitates the quantification of some particular attribute of component model 504 or the system model 502 as a whole. Examples of metric 510 may include bandwidth, latency, input/output operations, and other metrics.

Figure 6:
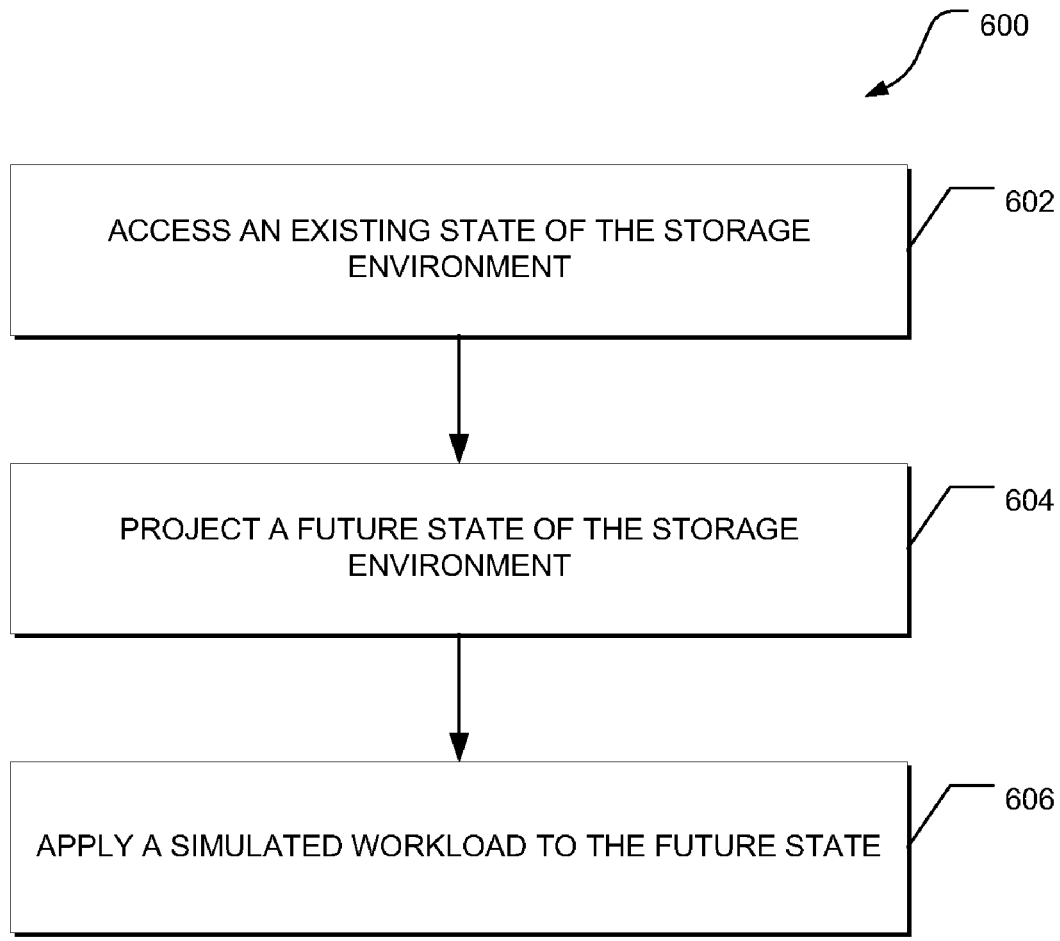
FIG. 6 depicts a flow diagram of a general overview of a method, in accordance with an example embodiment, for identifying an impact of a simulated workload on a storage environment at a future time.

FIG. 6 depicts a flow diagram of a general overview of a method 600, in accordance with an example embodiment, for identifying an impact of a simulated workload on a storage environment at a future time. In an example embodiment, method 600 may be implemented by discovery module 304 and analysis module 306 of FIG. 3 and employed in computing device 302.

A user may want to view and analyze a state of the storage environment at a specific future time. As depicted in FIG. 6, to model the storage environment in the future, an existing state of the storage environment from this specific past time is accessed at 602. A future state of the storage environment is then projected at 604 based on the existing state of the storage environment. In an example, a future state may be projected by extrapolation, which generally is the estimation or prediction of new values or variables outside a known range. Here, the known values or variables are one or more existing states of the storage environment and, as a result, the new future state may be extrapolated from the existing states. It should be appreciated that a variety of extrapolation techniques may be used, such as linear extrapolation, polynomial extrapolation, conic extrapolation, and other extrapolation techniques. In general, linear extrapolation estimates or projects values by creating a tangent line at the end of known values (e.g., values associated with existing states) and extending the known values beyond their limit. In polynomial extrapolation, a polynomial curve can be created through the known values that result in the polynomial curve extending beyond the known values. Conic extrapolation, in general, is based on the use of a conic section to extend beyond the known values. As will be explained in more detail below, the component models of a system model may be used to project the future state from the existing state.

With the future state projected, a simulated workload may then be applied to the existing state at 606 to identify an impact of the simulated workload on the future state. A user can therefore view, for example, the projection into the future of workload changes, growth scenarios, configuration changes, service engagements, and other impacts on the future. Such information may be used in the design or facilitate optimizations of storage environments.

Figure 7:
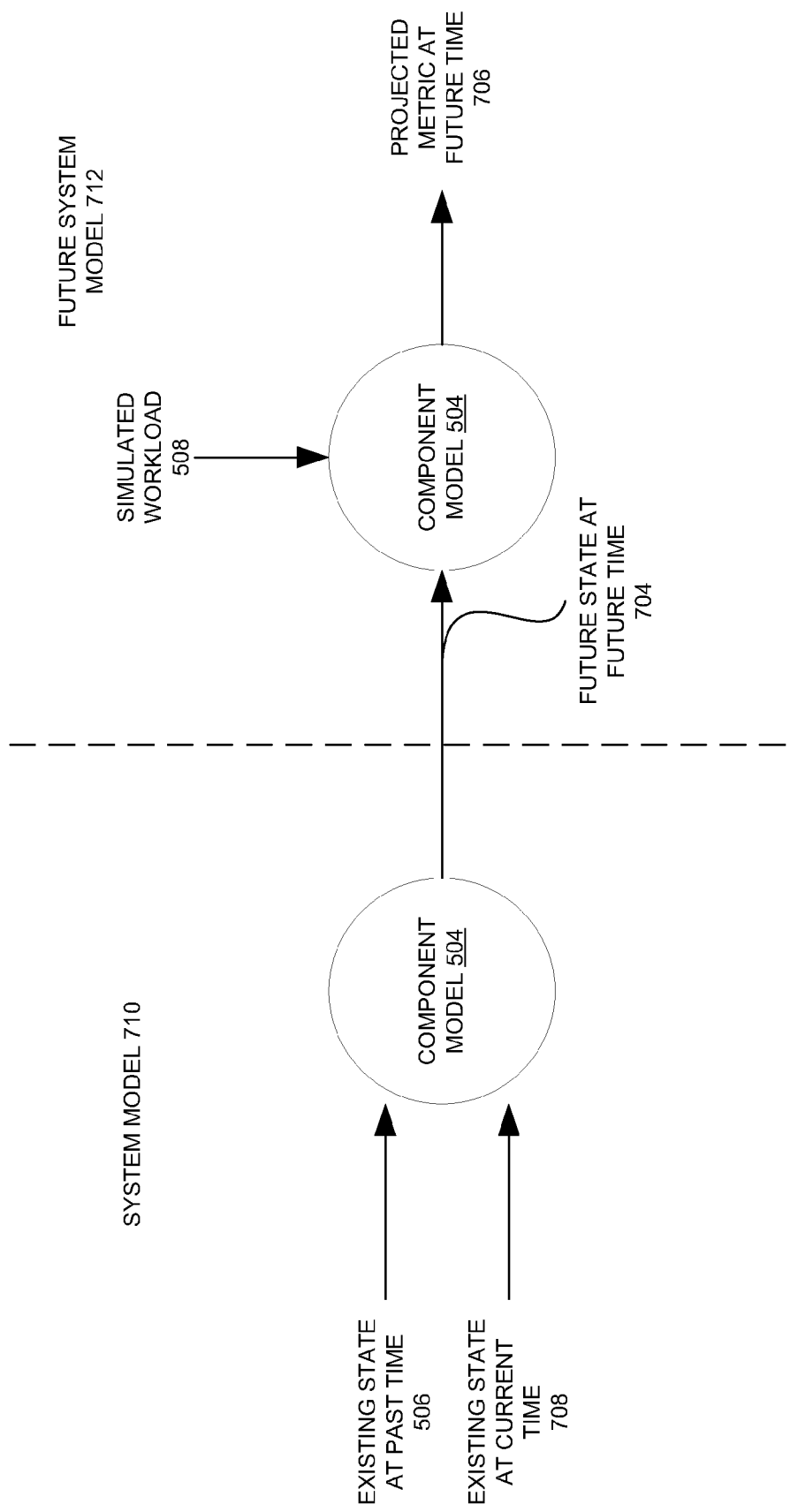
FIG. 7 is a diagram of a more detailed method, in accordance with an example embodiment, for identifying an impact of a simulated workload on a storage environment at a future time.

FIG. 7 is a diagram of a more detailed method, in accordance with an example embodiment, for identifying an impact of a simulated workload 508 on a storage environment at a future time. As discussed in above, a storage environment is comprised of a variety of components and each component may be simulated by one or more component models. A single component model 504 is depicted in FIG. 7 from a single node in a directed graph of a system model. The component model 504 is configured to simulate a component associated with a storage environment.

To identify an impact of simulated workload 508 at a future time, existing states 506 and 708 of the storage environment in the past are accessed. The existing states may include existing state at a past time 506 and/or existing state at current time 708. The existing state at current time 708 is a state that exists at the present or is in use now. For example, the existing state at current time 708 can be the most recent state recorded by the storage environment. The existing state at past time 506 is a state to have existed in or to have occurred during a time previous to the current time.

A system model 710 can then be composed based on this existing state, which is discussed in detail above. In an example, FIG. 7 depicts a single component model 504 from a collection of component models that comprise the system model 710. The existing states 506 and 708 are provided to system model 710. For example, existing states 506 and 708 are provided as inputs into component model 504. It should be appreciated that, as depicted in FIG. 7, one or multiple sets of existing states, such as 506 and 708, may be used as inputs into component model 504. The system model 710 may then project a future state at a future time 704 based on the existing states 506 and 708. For example, in the context of component model 504, the component model uses relevant portions of existing states 506 and 708 (relevant to the component model) to project a future state 704 of storage environment at a future time. As explained above, component model 504 may use a variety of extrapolation techniques to project the future state 704.

To identify an impact of simulated workload 508 at a future time, a future system model 712 may be composed based on the future state 704. For example, as discussed above, information regarding the type of component models associated with the storage environment and interconnectivity information can be extracted from the future state 704 and used to build the future system model 712. The simulated workload 508 may then be applied to the future system model 712, which simulates the storage environment in the future, to identify an impact of the simulated workload. In a simplified example, FIG. 7 depicts the same component model 504 from a collection of component models that comprise both system model 710 and future system model 712. The future state 704 is provided to future system model 712. For example, future state 704 is provided as an input into component model 504. The simulated workload 508 is also applied to component model 504 associated with future system model 712. As a result, component model 504 outputs projected metric 706, which defines an impact of the application of simulated workload 508 on future state 704 of storage environment, which is described above.

Figure 8:
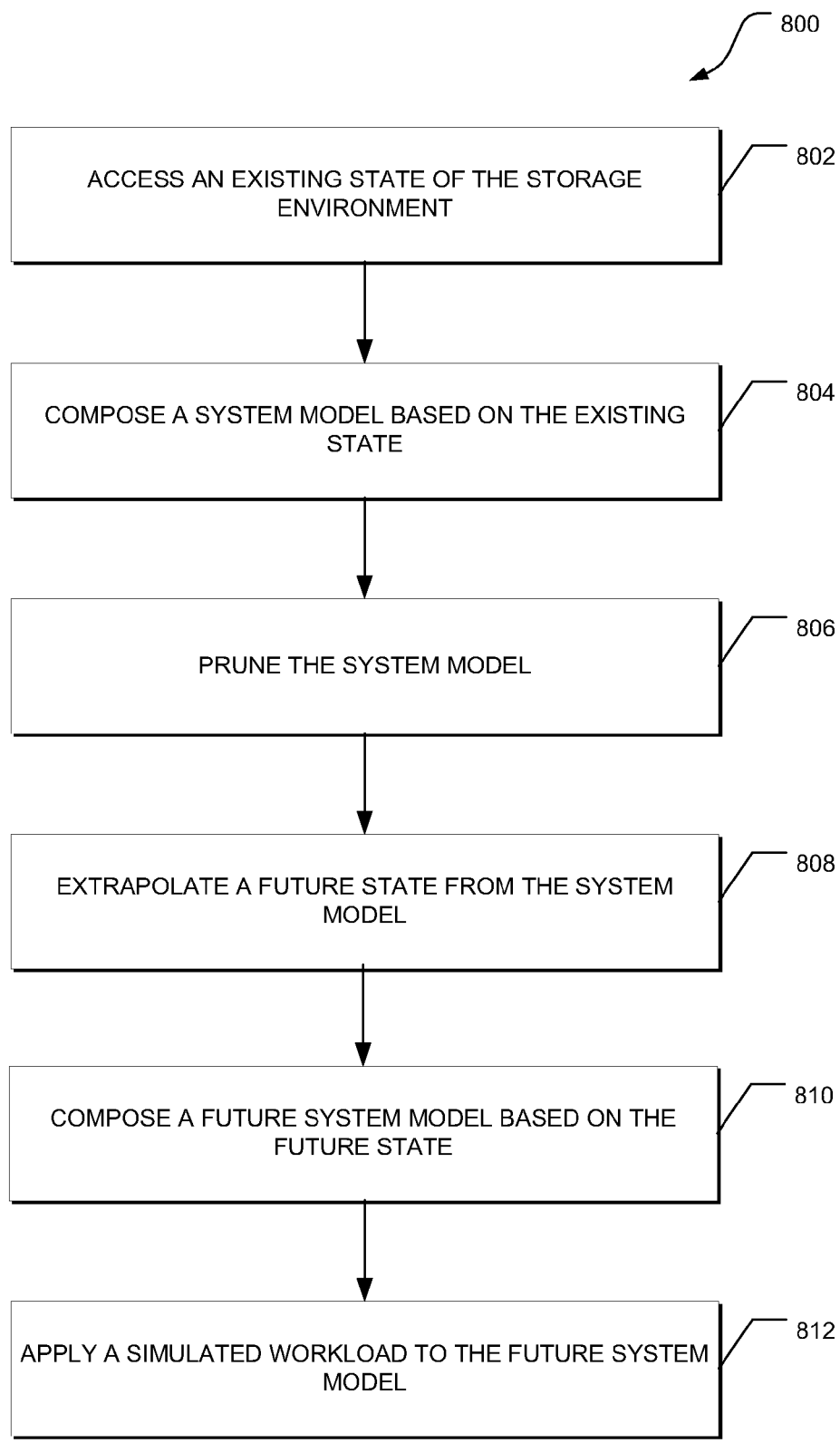
FIG. 8 is a flow diagram of a more detailed method, in accordance with an example embodiment, for modeling a storage environment at a future time.

FIG. 8 is a flow diagram of a more detailed method 800, in accordance with an example embodiment, for modeling a storage environment at a future time. In an example embodiment, method 800 may be implemented by discovery module 304 and analysis module 306 of FIG. 3 and employed in computing device 302. As depicted in FIG. 8, an existing state of the storage environment is accessed at 802. For example, as discussed above, the existing state may be stored in configuration tables and/or performance tables.

It should be appreciated that a user may also modify the existing state to, for example, analyze impacts of the simulated workload on a variety of different configurations. A user may want to identify an impact of a simulated workload on a future state when the existing state is modified. Modifications may include, for example, addition of component models, addition of functional relationships, deletion of functional relationships, and other modifications. Furthermore, as discussed above, the state of the storage environment may, for example, be defined by a set of attributes and values associated with the attributes. As such, the attributes and values that define the existing state (or even future states) may be modified. Such modifications may include the addition of attributes, deletion of attributes, modification of values associated with the attributes, and other modifications. More particular examples of attribute or value modifications may include increasing the buffer size, changing the RAID level, decreasing the number of ports, increasing bandwidth, and other modifications.

At 804, a system model may then be composed based on the existing state. Here, the system model is configured to simulate the storage environment at a time associated with the existing state. In an example embodiment, a future state is extrapolated from the system model at 808. In another example embodiment, the system model is pruned at 806 before the future state is extrapolated. Pruning is the removal of component models from the system model. A portion of component models may be removed from the system model to reduce the size of the system model. As a result, the extrapolation of the future state from a portion of the system model can be much faster and efficient when compared to extrapolating the future state from the system model as a whole because fewer components are modeled. A portion of the component models may be pruned based on a variety of factors. For example, as explained in more detail below, factors may include the type of relationships between component models, the type of impact or metric being sought, and other factors.

In an example, a portion of the component models may be pruned based on logical relationships between the component models and the type of impact or metric being sought. Logical relationships exist between component models that that are in communication and exchange data. Examples of data exchanges include exchange of simulated workload flows, supply of functional resources to each other, and a variety of other data exchanges. The component models that do not have relationships to component models that are relevant to a particular calculation of a metric may be pruned from the system model. As an example, a storage environment may include two storage servers, which is referenced as storage server A and storage server B. Storage server A supports computations on several host computers A-C. On the other hand, storage server B supports computations on other host computers D-F. The storage server A is not connected to storage server B. The storage server A therefore does not communicate or exchange data with storage server B. If the impact of a simulated workload on a future state of storage server A or host computers A-C, which are in communication with storage server A, is to be identified, then storage server B and its host computers D-F may be pruned from the system model of the storage environment. The storage server B and its host computers D-F may be pruned because storage server B and its host computers D-F do not communicate with storage server A and its host computers A-C. Vice versa, if the impact of a simulated workload on a future state of storage server B or its host computers D-F is to be identified, then storage server A and its host computers D-F may be pruned from the system model of the storage environment.

In another example, a portion of the component models may be pruned from a system model based on the supply of functional resources. As an example, a storage environment may include a storage server A, a storage server B, and a storage device. The storage server A is in communication with storage server B and storage device is physically connected to storage server B. As a functional resource, storage server B stores to and retrieves data from the storage device. Here, an impact of a simulated workload on the storage server B is to be identified. Although storage server A is in communication with storage server B, storage server A does not provide any functional resources to storage server B. Therefore, in an example, storage server A may be pruned from the system model because storage server A and storage server B do not provide functional resources to each other.

As a further example, a portion of the component models may also be pruned based on the accuracy of impact or metric being sought. For example, a quick estimate of an impact of a simulated workload on a future state may be sought. Here, the accuracy of the resultant impact or metric may be sacrificed for a fast analysis. In this example, component models that do not significantly contribute to the impact analysis may be pruned from the system model. The speed of the impact analysis may be increased with fewer component models to analyze. When a more detailed impact analysis is sought for the same system model, the pruned component models may be added back to the system model and the system model may then be analyzed again for impact.

Still referring to FIG. 8, the future system model is then composed at 810 based on the future state. Here, the future system model is configured to simulate the storage environment at a future time. In an example embodiment, the simulated workload may then be applied to the future system model at 812 to identify an impact of the simulated workload on the future system model. In another example embodiment, a user may also modify the future system model to, for example, analyze impacts of the simulated workload on a variety of different configurations. In an example embodiment, the future state of the storage environment may be modified. Modifications may include, for example, addition of component models, deletion of component models, addition of functional relationships, deletion of functional relationships, addition of attributes, deletion of attributes, modification of values associated with the attributes, and other modifications. In this example embodiment, the simulated workload may then be applied to the future state of the storage environment that is modified.

Figure 9A:
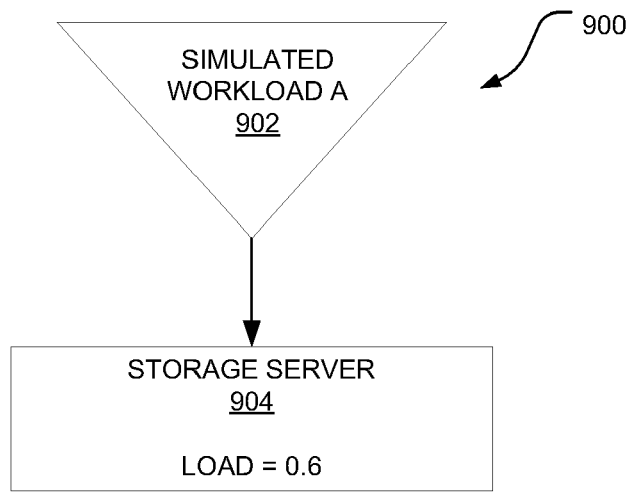
FIGS. 9A-9D are directed graphs depicting examples of system models at various times, in accordance with example embodiments.

FIGS. 9A-9D are directed graphs depicting examples of system models at various times, in accordance with example embodiments. FIG. 9A depicts a directed graph of an example system model 900 at an existing state. System model 900 at the existing state includes storage server 904. Generally, storage server 904 is a computing device that provides file services relating to the storage, organization, and access of data stored in storage devices. An example of storage server 904 may include a NAS server. As depicted in FIG. 9A, a simulated workload A 902 is applied to storage server 904 at the existing state. As a result of simulated workload A 902, storage server 904 has a load rating of 0.6. In this example, the load rating is a ratio between the current loading and a maximum loading of storage server 904. The load rating may range from 0 to 1, where a load rating of 0 indicates that storage server 904 is not loaded and a load rating of 1 indicates that the storage server is fully loaded.

Figure 9B:
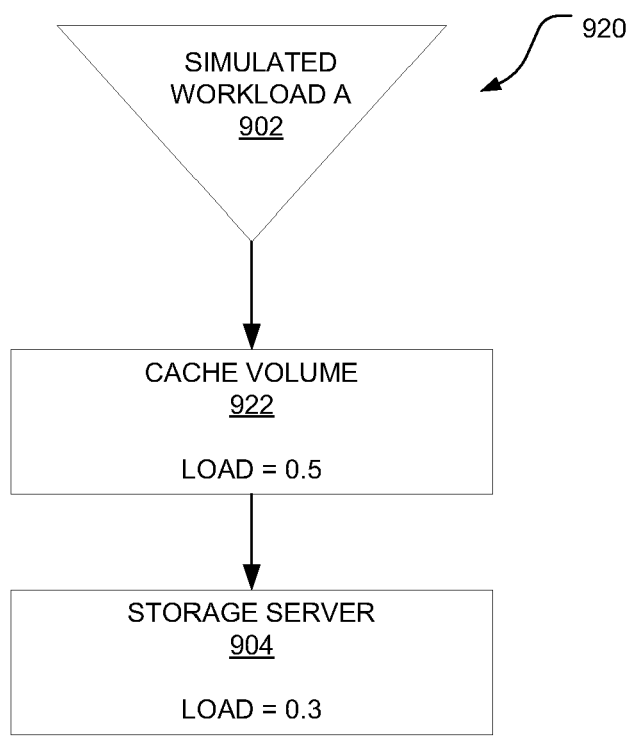

FIG. 9B depicts a directed graph of an example system model 920 at a future state. In this example, the future state of system model 920 is projected from the existing state of system model 900, which is depicted in FIG. 9A. Returning to FIG. 9B, system model 920 at the future state includes storage server 904 in communication with cache volume 922. In general, cache volume 922 is a caching layer included within a storage environment. The cache volume 922 is configured to temporarily store data for fast retrieval of data. Here, the same simulated workload A 902 is applied to cache volume 922. Based on a load rating of 0.6 assigned to storage server 904 at the existing state, which is depicted above, as well as other attributes, the load ratings of both cache volume 922 and storage server 904 may be projected. In an example, linear extrapolation may be used to extrapolate a load rating of 0.5 for cache volume 922 and a load rating of 0.3 for storage server 904 based on the existing load rating of 0.6 for the storage server. As a result of the addition of cache volume 922 in the future state, the load rating of storage server is projected to drop from 0.6 to 0.3.

Figure 9C:
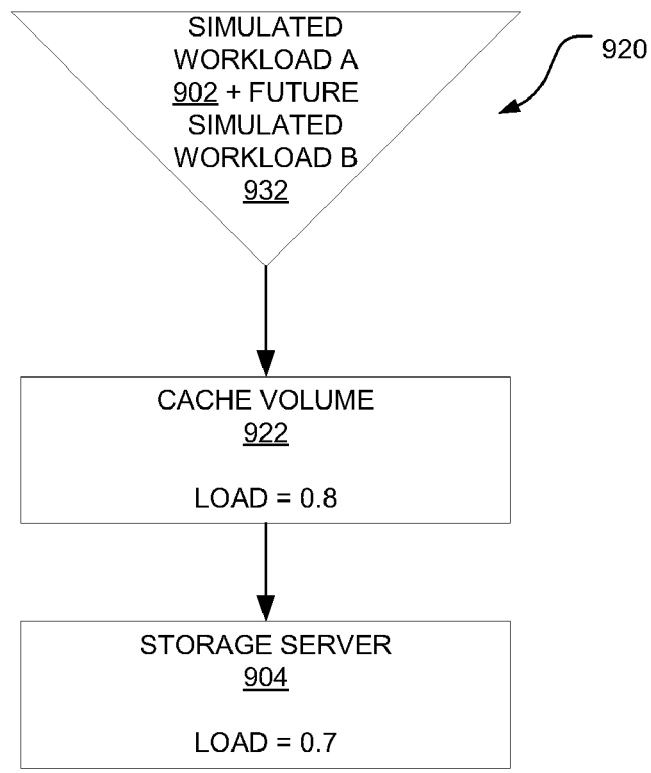

FIG. 9C depicts a directed graph of an example system model 920 at a future state with an additional simulated workload applied. Similar to system model 920 depicted in FIG. 9B, system model 920 at the future state depicted in FIG. 9C includes cache volume 922 and storage server 904. In addition to the application of workload A 902, a future simulated workload B 932 is further applied to cache volume 922. This future simulated workload B 932 may be a workload separate from simulated workload A 902 or it could define a growth of the simulated workload A over a period of time. The impact of the application of future simulated workload B 932 identifies that the load ratings for both cache volume 922 and storage server 902 increased to 0.8 and 0.7, respectively.

Figure 9D:
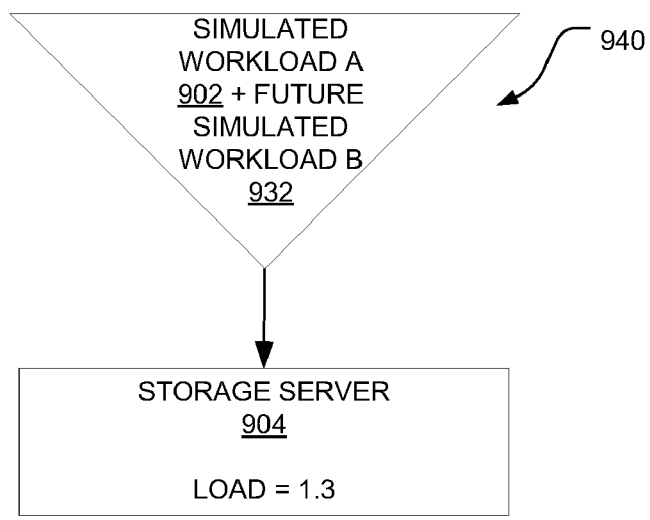

FIG. 9D depicts a directed graph of an example system model 940 at an existing state with additional simulated workload applied. FIG. 9D depicts a directed graph of the example system model 900 at the existing state. Similar to System model 900 depicted in FIG. 9A, system model 900 at the existing state depicted in FIG. 9D includes storage server 904. However, in addition to the application of workload A 902, a future simulated workload B 932 is further applied to storage server 904. As a result, the load rating of storage server 904 increases to 1.3, which represents an overloading of the storage server. A user may use the projection capabilities to model a storage environment at a future state to identify or forecast the impact of the increased future simulated workload B 932. For example, by analyzing the predicted load ratings depicted in FIGS. 9B and 9C, the user may include a cache volume 922 in storage environment to alleviate the load on storage server 904.

Figure 10:
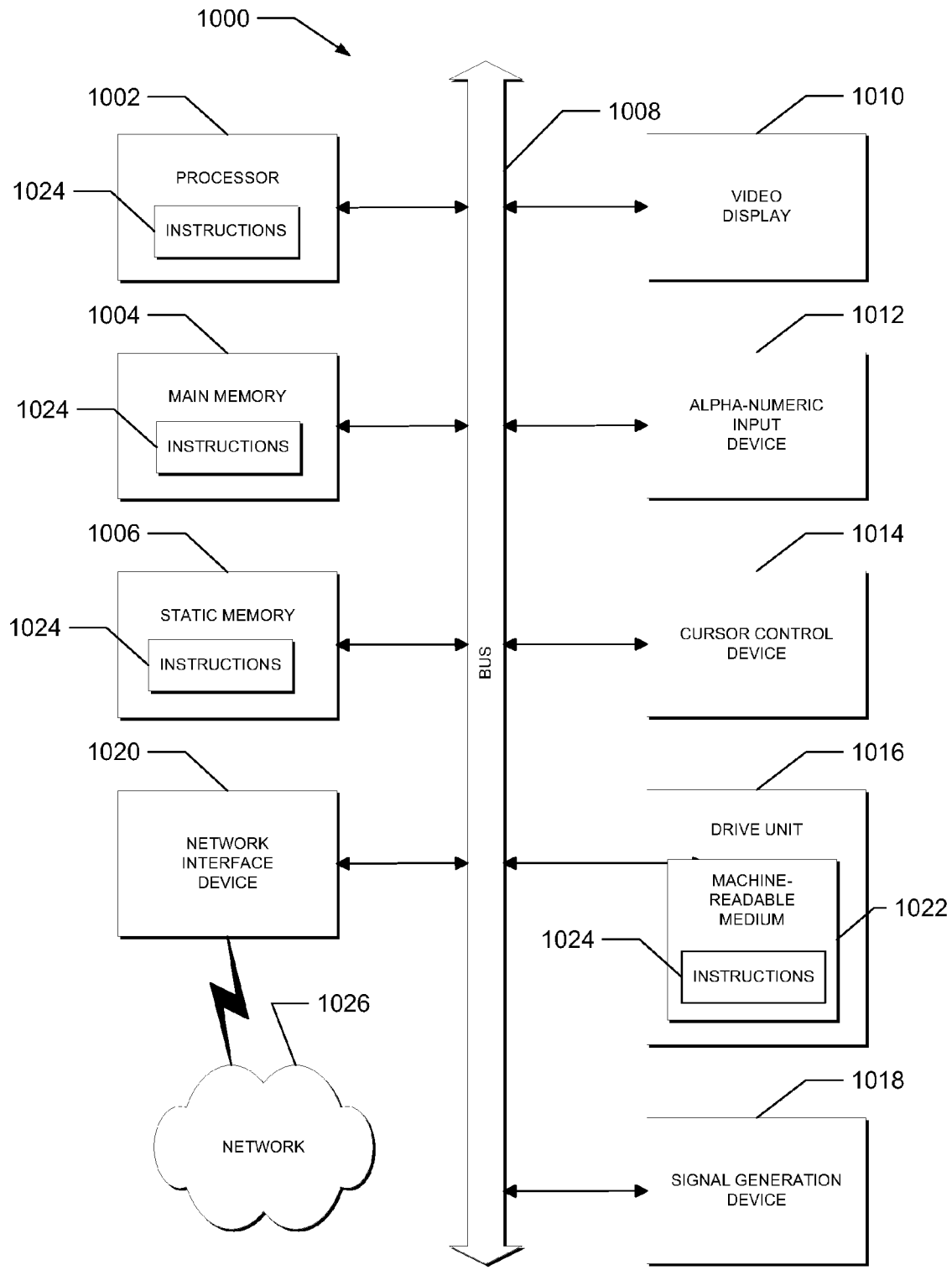
FIG. 10 is a block diagram of a machine in the example form of a computing system within which a set of instructions, for causing the machine to perform any one or more of the methodologies discussed herein, may be executed.

FIG. 10 is a block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a Personal Digital Assistant (PDA), a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 1000 includes processor 1002 (e.g., a central processing unit (CPU), a graphics processing unit (GPU) or both), main memory 1004 and static memory 1006, which communicate with each other via bus 1008. Computing system 1000 may further include video display unit 1010 (e.g., a plasma display, a liquid crystal display (LCD) or a cathode ray tube (CRT)). Computing system 1000 also includes alphanumeric input device 1012 (e.g., a keyboard), user interface (UT) navigation device 1014 (e.g., a mouse), disk drive unit 1016, signal generation device 1018 (e.g., a speaker) and network interface device 1020.

Disk drive unit 1016 includes machine-readable medium 1022 on which is stored one or more sets of instructions and data structures (e.g., software 1024 such as storage system analytics module 303 depicted in FIG. 3) embodying or utilized by any one or more of the methodologies or functions described herein. Software 1024 may also reside, completely or at least partially, within main memory 1004 and/or within processor 1002 during execution thereof by computing system 1000, with main memory 1004 and processor 1002 also constituting machine-readable, tangible media. Software 1024 may further be transmitted or received over network 1026 via network interface device 1020 utilizing any one of a number of well-known transfer protocols (e.g., Hypertext Transfer Protocol (HTTP)).

While machine-readable medium 1022 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques modeling a storage environment at a specific time may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method of modeling a storage environment at a specific time, the method comprising:
   accessing an existing state of the storage environment;
   projecting a future state of the storage environment, using a processor, based on the existing state of the storage environment;
   applying a simulated workload to the future state of the storage environment to identify an impact of the simulated workload on the future state; and
   composing a future system model of the storage environment based on the future state, the future system model configured to simulate the storage environment at the specific time in a future, wherein the applying of the simulated workload comprises applying the simulated workload to the future system model of the storage environment.

2. The method of claim 1, further comprising composing a system model based on the existing state of the storage environment, the system model configured to simulate the storage environment and to project the future state of the storage environment based on the existing state.

3. The method of claim 1, wherein the existing state of the storage environment is from a past time, and the specific time being the past time, the method further comprising applying the simulated workload to the existing state of the storage environment to identify the impact of the simulated workload on the existing state.

4. The method of claim 3, further comprising composing a system model of the storage environment based on the existing state, the system model configured to simulate the storage environment at the past time, wherein the simulated workload is applied to the system model of the storage environment.

5. The method of claim 1, wherein the future state of the storage environment is projected based on one or more of a linear extrapolation, a polynomial extrapolation or a conic extrapolation.

6. The method of claim 1, wherein the state of the existing system is defined by an attribute of the storage environment and a value associated with the attribute.

7. The method of claim 1, further comprising:
   modifying the future state of the storage environment,
   wherein the simulated workload is applied to the future state of the storage environment that is modified.

8. A method of modeling a storage environment at a specific time, the method comprising:
   accessing an existing state of the storage environment;
   composing a system model based on the existing state, the system model configured to simulate the storage environment;
   extrapolating a future state of the storage environment from the system model;
   composing a future system model based on the future state, the future system model configured to simulate the storage environment at the specific time in a future; and
   applying a simulated workload to the future system model to identify an impact of the simulated workload on the future system model.

9. The method of claim 8, wherein the system model is composed from a plurality of component models, each component model from the plurality of component models configured to simulate a component of the storage environment, and wherein the plurality of component models is configured to extrapolate the future state based on the existing state.

10. The method of claim 8, wherein the existing state of the storage environment is from the specific time in a past time, the method further comprising applying the simulated workload to the system model to identify the impact of the simulated workload on the system model at the past time.

11. The method of claim 8, wherein the storage environment includes a plurality of components that is simulated by a plurality of component models, the system model including the plurality of component models, the method further comprising pruning a portion of the plurality of component models from the system model, and wherein the future state is extrapolated from the system model that is pruned.

12. The method of claim 11, wherein the portion of the plurality of component models is pruned from the system model based on a relationship between the plurality of component models.

13. The method of claim 8, wherein the existing state of the storage environment is from a current time.

14. The method of claim 8, wherein the existing state of the storage environment is from a past time.

15. A computing device, comprising:
   at least one processor; and
   a non-transitory, machine-readable medium in communication with the at least one processor, the non-transitory, machine-readable medium storing a configuration table and a performance table configured to store a plurality of existing states of a storage environment at a plurality of past times, the non-transitory, machine-readable medium further storing a discovery module and an analysis module that are executable by the at least one processor,
   the discovery module being executed by the at least one processor to cause the operations to be performed, comprising accessing the plurality of existing states of the storage environment from one or more of the configuration table or the performance table,
   the analysis module being executed by the at least one processor to cause the operations to be performed, comprising:
   projecting a future state of the storage environment at a future time based on the plurality of existing states of the storage environment;

applying a simulated workload to the future state of the storage environment to identify an impact of the simulated workload on the future state; and composing a future system model based on the future state, the future system model configured to simulate the storage environment at the future time, wherein the operation of applying the simulated workload comprises applying the simulated workload to the future system model.

16. The computing device of claim 15, wherein the operations, when the analysis module is executed, further comprises modifying an existing state from the plurality of existing states, wherein the future state of the storage environment is projected from the plurality of existing states that includes the existing state that is modified.

17. The computing device of claim 15, wherein the operations, when the analysis module is executed, further comprise applying the simulated workload to an existing state from the plurality of existing states to identify an impact of the simulated workload on the existing state.

18. The computing device of claim 15, wherein the operations, when the analysis module is executed, further comprise:

composing a system model of the storage environment based on an existing state from the plurality of existing states, the system model being configured to simulate the storage environment, wherein the system model is configured to project the future state of the storage environment based on the plurality of existing states.

* * * * *